United States Patent
Dabak et al.

(10) Patent No.: US 7,701,916 B2
(45) Date of Patent: Apr. 20, 2010

(54) SPACE TIME TRANSMIT DIVERSITY FOR TDD WITH CYCLIC PREFIX MIDAMBLE

(75) Inventors: Anand G. Dabak, Plano, TX (US); Timothy M. Schmidl, Dallas, TX (US); Chaitali Sengupta, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1204 days.

(21) Appl. No.: 10/823,130

(22) Filed: Apr. 13, 2004

(65) Prior Publication Data
US 2004/0190603 A1 Sep. 30, 2004

Related U.S. Application Data

(63) Continuation of application No. 09/514,452, filed on Feb. 25, 2000, now Pat. No. 6,775,260.

(60) Provisional application No. 60/121,541, filed on Feb. 25, 1999, provisional application No. 60/121,657, filed on Feb. 25, 1999, provisional application No. 60/135,263, filed on May 21, 1999.

(51) Int. Cl.
*H04L 1/02* (2006.01)
*H04B 1/56* (2006.01)
(52) U.S. Cl. .................. 370/342; 370/276; 370/335; 375/148; 375/152; 375/267; 455/101; 455/273
(58) Field of Classification Search ......... 370/204–267, 370/294–342, 350–479, 276–280; 375/143–152, 375/260–347; 455/426–502, 101–273
See application file for complete search history.

(56) References Cited

U.S. PATENT DOCUMENTS 5,437,055 A * 7/1995 Wheatley, III ............. 455/429

(Continued)

FOREIGN PATENT DOCUMENTS

EP 1 006 676 A2 6/2000

(Continued)

OTHER PUBLICATIONS

"A Novel Transmission Diversity System in TDD-CDMA", Incheol Jeong, et al., Spread Spectrum Techniques and Applications, 1998. Proceedings., 1998 IEEE 5th International Symposium, Sep. 2, 1998-Sep. 4, 1998, vol. 3, pp. 771-775.

(Continued)

*Primary Examiner*—M. Phan
(74) *Attorney, Agent, or Firm*—Lawrence J. Bassuk; W. James Brady; Frederick J. Telecky, Jr.

(57) ABSTRACT

A circuit is designed with a matched filter circuit including a plurality of fingers (700, 702, 704) coupled to receive a data symbol. Each finger corresponds to a respective path of the data symbol. Each finger produces a respective output signal. A plurality of decoder circuits (706, 708, 710) receives the respective output signal from a respective finger of the plurality of fingers. Each decoder circuit produces a respective output signal. A joint detector circuit (1310) is coupled to receive each respective output signal from the plurality of decoder circuits. The joint detector circuit produces an output signal corresponding to a predetermined code.

8 Claims, 9 Drawing Sheets

U.S. PATENT DOCUMENTS

| | | | |
|---|---|---|---|
| 5,737,327 | A | 4/1998 | Ling et al. |
| 5,859,875 | A | 1/1999 | Kato et al. |
| 6,154,485 | A * | 11/2000 | Harrison .................... 375/130 |
| 6,178,196 | B1 * | 1/2001 | Naguib et al. ............... 375/148 |
| 6,185,258 | B1 * | 2/2001 | Alamouti et al. ............ 375/260 |
| 6,212,219 | B1 * | 4/2001 | Shou et al. .................. 375/130 |
| 6,275,506 | B1 * | 8/2001 | Fazel et al. ................. 370/478 |
| 6,317,411 | B1 * | 11/2001 | Whinnett et al. ............ 370/204 |
| 6,370,130 | B1 * | 4/2002 | Zhou et al. .................. 370/335 |
| 6,373,831 | B1 * | 4/2002 | Secord et al. ............... 370/342 |
| 6,396,821 | B1 * | 5/2002 | Takahashi ................... 370/335 |
| 6,430,212 | B1 * | 8/2002 | Alisobhani et al. .......... 375/141 |
| 6,449,314 | B1 * | 9/2002 | Dabak et al. ................ 375/267 |
| 6,483,826 | B1 * | 11/2002 | Åkerberg .................... 370/335 |
| 6,496,534 | B1 * | 12/2002 | Shimizu et al. ............. 375/148 |
| 6,594,317 | B2 * | 7/2003 | Gorday et al. .............. 375/259 |
| 6,594,473 | B1 * | 7/2003 | Dabak et al. ................ 455/101 |
| 6,775,260 | B1 * | 8/2004 | Dabak et al. ................ 370/342 |
| 6,917,597 | B1 * | 7/2005 | Schmidl et al. ............. 370/280 |
| 7,218,692 | B2 * | 5/2007 | Dabak et al. ................ 375/346 |
| 7,372,825 | B1 * | 5/2008 | Schmidl et al. ............. 370/328 |
| 2001/0024426 | A1 * | 9/2001 | Zeira et al. .................. 370/329 |
| 2002/0027948 | A1 * | 3/2002 | Schilling .................... 375/143 |
| 2002/0061005 | A1 * | 5/2002 | Lee et al. .................... 370/342 |
| 2003/0058929 | A1 * | 3/2003 | Cox et al. ................... 375/150 |
| 2004/0101032 | A1 * | 5/2004 | Dabak et al. ................ 375/143 |
| 2006/0013151 | A1 * | 1/2006 | Lee et al. .................... 370/280 |

FOREIGN PATENT DOCUMENTS

EP   1 056 237 A2   11/2000

OTHER PUBLICATIONS

"A Simple Transmit Diversity Technique for Wireless Communications", Slavash M. Alamoutl, IEEE Journal on Selected Areas In Communications, IEEE Inc., New York, US, vol. 16, No. 8, Oct. 1998, pp. 1451-1458, XP002100058, ISSN: 0733-8716.

"Equalization and Multi-User Detection for Space Time Block Coding Based Transmit Diversity (STTD) In Frequency Selective Channels", Anand G. Dabak, et al., IEEE, 2000, VTC 2000, pp. 506-513.

"Space Time Block Coded Transmit Antenna Diversity Scheme for WCDMA", Anand G. Dabak, et al., Wireless Communications and Networking Conference, WCNC 1999, IEEE New Orleans, LA, USA Sep. 21-24, 1999, pp. 1466-1469, XP010353636, ISBN: 0-7803-5668-3.

"3$^{rd}$ Generation Partnership Project; Technical Specification Group Radio Access Network; Physical Channels and Mapping of Transport Channels onto Physical Channels (TDD) (3G TS 25.221 version 3.1.0 (Dec. 1999)", Technical Specification, pp. 2-47.

"UTRA FDD and TDD, a harmonized proposal for IMT-2000", W. Mohr, International Conference on Communication Technology, Oct. 22-24, 1998, Communication Technology Proceedings, 1998. ICCT '98., Beijing, China, pp. S22-03-1 to S22-03-5.

"Zero Forcing and Minimum Mean-Square-Error Equalization for Multiuser Detection in Code-Division Multiple-Access Channels", Anja Klein, et al., IEEE Transactions on Vehicular Technology, vol. 45, No. 2, May 1996, pp. 276-287.

\* cited by examiner

MINIMUM MEAN SQUARED ERROR
STTD EQUALIZER, INTERFERENCE
CANCELLATION WITH DECISION FEEDBACK

SPACE TIME TRANSMIT DIVERSITY FOR TDD WITH CYCLIC PREFIX MIDAMBLE

CLAIM TO PRIORITY OF PROVISIONAL APPLICATION

This application claims priority under 35 U.S.C. §119(e)(1) of provisional application Ser. No. 60/121,541, filed Feb. 25, 1999, provisional application Ser. No. 60/121,657, filed Feb. 25, 1999, provisional application Ser. No. 60/135,263, filed May 21, 1999 and is a continuation of application Ser. No. 09/514,452, filed Feb. 25, 2000, now U.S. Pat. No. 6,775,260, issued Aug. 10, 2004.

FIELD OF THE INVENTION

This invention relates to wideband code division multiple access (WCDMA) for a communication system and more particularly to space time block coded transmit antenna diversity for WCDMA.

BACKGROUND OF THE INVENTION

Present code division multiple access (CDMA) systems are characterized by simultaneous transmission of different data signals over a common channel by assigning each signal a unique code. This unique code is matched with a code of a selected receiver to determine the proper recipient of a data signal. These different data signals arrive at the receiver via multiple paths due to ground clutter and unpredictable signal reflection. Additive effects of these multiple data signals at the receiver may result in significant fading or variation in received signal strength. In general, this fading due to multiple data paths may be diminished by spreading the transmitted energy over a wide bandwidth. This wide bandwidth results in greatly reduced fading compared to narrow band transmission modes such as frequency division multiple access (FDMA) or time division multiple access (TDMA).

New standards are continually emerging for next generation wideband code division multiple access (WCDMA) communication systems as described in U.S. patent application Ser. No. 90/205,029, filed Dec. 3, 1998, and incorporated herein by reference. Therein, Dabak et al. describe a method of space-time transmit diversity (STTD) for frequency division duplex (FDD) WCDMA systems. These FDD systems are coherent communications systems with pilot symbol assisted channel estimation schemes. These pilot symbols are transmitted as quadrature phase shift keyed (QPSK) known data in predetermined time frames to any receivers within range. The frames may propagate in a discontinuous transmission (DTX) mode. For voice traffic, transmission of user data occurs when the user speaks, but no data symbol transmission occurs when the user is silent. Similarly for packet data, the user data may be transmitted only when packets are ready to be sent. The frames include pilot symbols as well as other control symbols such as transmit power control (TPC) symbols and rate information (RI) symbols. These control symbols include multiple bits otherwise known as chips to distinguish them from data bits. The chip transmission time ($T_C$), therefore, is equal to the symbol time rate (T) divided by the number of chips in the symbol (G).

Time division duplex (TDD) provides an alternative communication standard for WCDMA, FDD systems. TDD data are transmitted as QPSK symbols in data packets of a predetermined duration or time slot. Each data packet includes a predetermined training sequence or midamble within the time slot. Data packets are exchanged within a cell formed by a base station in communication with nearby mobile units. Data in adjacent cells are modulated by different periodic codes. The midamble is formed by adding time shifted versions of the same basic sequence, wherein each time shift corresponds to a mobile unit within the cell. The spreading factor (SF) or chips per symbol of the modulation is preferably sixteen or less. The basic periodic code that modulates midamble symbols within the cell is shifted to uniquely identify each mobile unit within the cell. Since the periodic code within the cell is the same and the spreading factor is small, however, interference from the base station and other mobile units within the cell is not received as Gaussian noise. Typical matched filter circuits used in FDD systems, therefore, are unsuitable for eliminating this intra cell interference. A solution to this problem was presented by Anja Klein et al., *Zero Forcing and Minimum Mean-Square-Error Equalization for Multiuser Detection in Code-Division Multiple-Access Channels*, IEEE Trans. on Vehicular Technology, 276-287 (1996), and incorporated by reference herein. Therein, Klein et al. teach zero forcing (ZF) and minimum mean-square-error (MMSE) equalization with and without decision feedback (DF) to reduce both inter-symbol interference (ISI) and multiple-access interference (MAI). Klein et al. further cites P. Jung, J. Blanz, and P. W. Baier, *Coherent Receiver Antenna Diversity for CDMA Mobile Radio Systems Using Joint Detection*, Proc. IEEE Int. Symp. Pers. Indoor and Mobile Radio Communications, 488-492 (1993), for the proposition that these techniques may be used in combination with antenna diversity. A. Naguib, N. Seshadri and A. R. Calderbank, *Applications of Space-Time Block Codes and Interference Suppression for High Capacity and High Data Rate Wireless Systems*, Proc. of the Asilomar Conference, 1803-1810 (1998) further expand the work of Klein et al. Space time transmit diversity, however, was unknown at the time of either work. Thus, neither Klein et al. nor Jung et al. teach or suggest a method to combine STTD with joint detection of TDD systems. Moreover, neither Klein et al. nor Jung et al. teach a communication system having the advantages of STTD and joint detection of TDD systems.

SUMMARY OF THE INVENTION

These problems are resolved by a circuit designed with a matched filter circuit including a plurality of fingers coupled to receive a data symbol. Each finger corresponds to a respective path of the data symbol. Each finger produces a respective output signal. A plurality of decoder circuits receives the respective output signal from a respective finger of the plurality of fingers. Each decoder circuit produces a respective output signal. A joint detector circuit is coupled to receive each respective output signal from the plurality of decoder circuits. The joint detector circuit produces an output signal corresponding to a predetermined code.

The present invention improves reception by providing at least 2L diversity over time and space for TDD systems. No additional transmit power or bandwidth is required. Power is balanced across multiple antennas.

BRIEF DESCRIPTION OF THE DRAWINGS

A more complete understanding of the invention may be gained by reading the subsequent detailed description with reference to the drawings wherein.

DETAILED DESCRIPTION OF THE PREFERRED EMBODIMENTS

Figure 1:
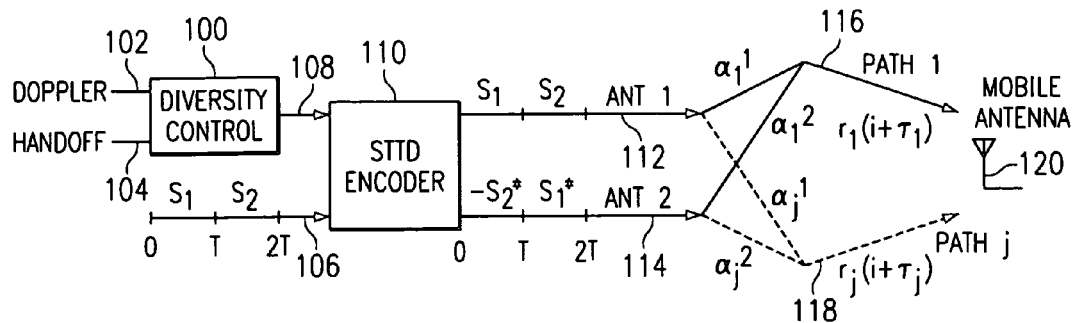
FIG. 1 is a block diagram of a transmitter of the present invention using diversity control.

Referring to FIG. 1, there is a simplified block diagram of a transmitter of the present invention using Space-Time Transit Diversity (STTD). The transmitter circuit includes a diversity control circuit 100 that is coupled to receive a Doppler control signal on lead 102 and a handoff control signal on lead 104. The Doppler control signal is determined by comparing sequential midamble symbols from mobile units in the same cell as the transmitter. An increasing difference between received midamble symbols indicates a greater Doppler rate due to velocity of the mobile unit with respect to the transmitter. The handoff signal is determined by mobile unit reports indicating received signal strength from surrounding base stations; For low Doppler rates when no base station handoff is required, the diversity control circuit produces a first value of a control signal on lead 108. This first value applied to STTD encoder circuit 110 directs the encoder circuit to apply switched transmit diversity (STD) to transmit antennas 112 and 114. Thus, received symbols on leads 106 are alternately transmitted at antennas 112 and 114.

Alternatively, for high Doppler rates or when a base station handoff is required, the diversity control circuit produces a second value of a control signal on lead 108. This second value directs the STTD encoder circuit 110 to apply STTD to transmit antennas 112 and 114. Thus, the encoder circuit simultaneously produces a symbol $S_1$ at antenna 112 and transformed symbol $-S_2^*$ at antenna 114. These symbols are transmitted to a remote mobile antenna 120 along multiple paths 116 and 118. This design is highly advantageous in providing improved communication via STTD encoding for high Doppler rates as well as during weak signal periods such as during base station handoff. For broadcast channels such as the primary common control channel (PCCPCH), for example. STTD encoding is preferably used for all transmissions. This is advantageous, since the broadcast channel transmission is directed to all mobile receivers without regard to their specific diversity requirements.

Figure 2:
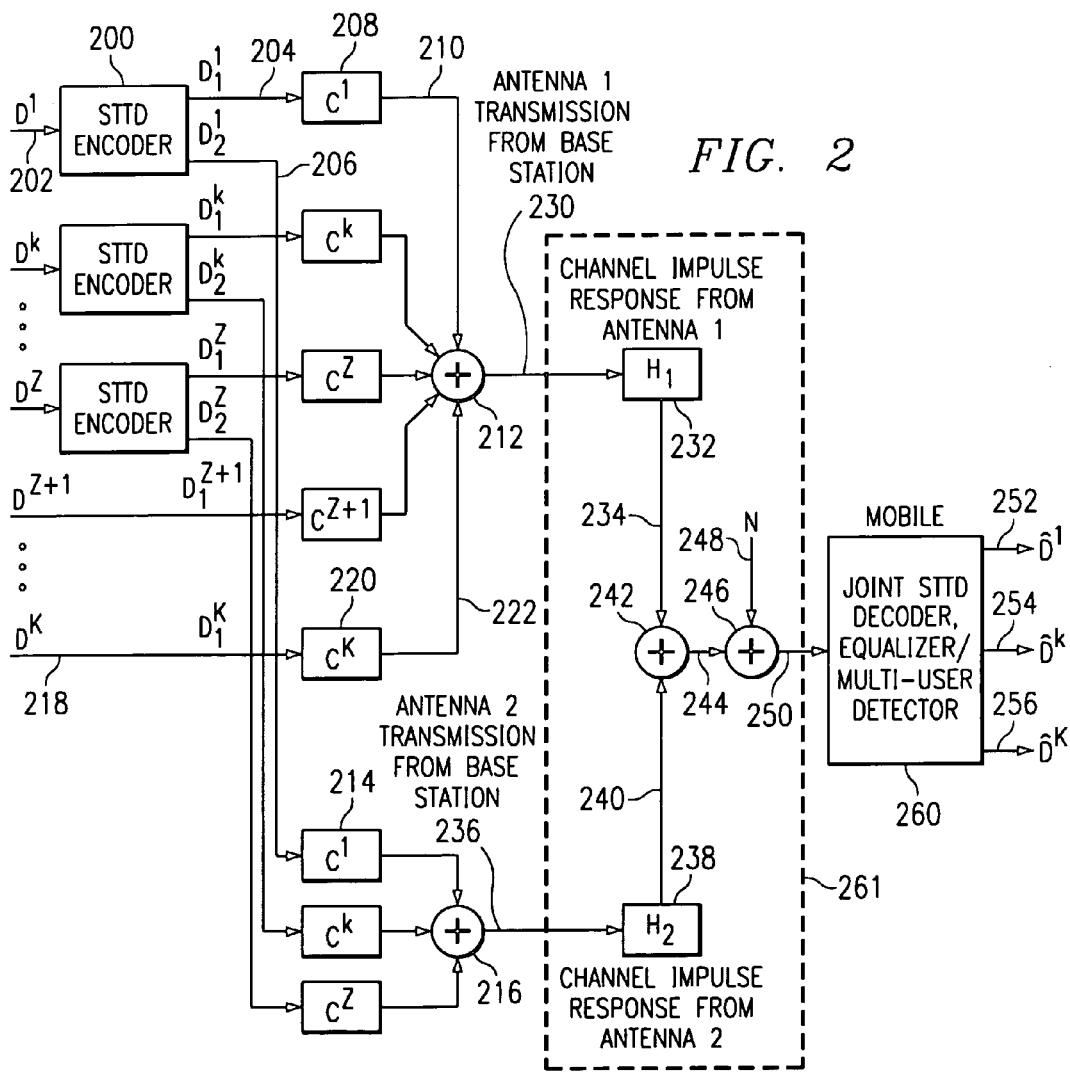
FIG. 2 is a block diagram of a communication system of the present invention showing communication with mobile units with and without diversity.

Turning now to FIG. 2, there is a block diagram of a communication system of the present invention showing communication with mobile units with and without diversity. The exemplary configuration provides STTD for users 1 through Z and no diversity for users Z+1 through K. The communication system, therefore, provides STTD for data symbols on lead 202 as well as no diversity for data symbols on lead 218. Data symbols $D^1$ at lead 202 are STTD encoded by encoder circuit 200 to produce encoded data symbols $D_1^1$ on lead 204 and encoded data symbols $D_2^1$ on lead 206. Encoded data symbols $D_1^1$ on lead 204 are multiplied by a predetermined user specific code or sequence $C^1$ by circuit 208 and applied to summation circuit 212. Summation circuit 212 sums these encoded data symbols together with other user specific data symbols and applies them to antenna 1 at lead 230. Likewise, data symbols $D_2^1$ on lead 206 are multiplied by the same user specific code $C^1$ by circuit 214 and applied via 210 to summation circuit 216. Summation circuit 216 sums these encoded data symbols together with other user specific data symbols and applies them to antenna 2 at lead 236. These summed symbols are transmitted over radio channel 261 to a mobile receiver antenna at lead 250. The transmitted symbols are effectively multiplied by channel impulse response matrices $H_1$ 232 and $H_2$ 238 on respective paths 234 and 240 and summed by path 242. Noise N is added by path 246 to produce the received signal at antenna 250. A joint STTD decoder circuit 260 receives the composite signal and produces user specific symbol sequences $\hat{D}^1$ on lead 252, $\hat{D}^k$ on lead 254 and $\hat{D}^K$ on lead 256, corresponding respectively to K users.

In the case where no transmit diversity is employed or where other forms of diversity such as switched transmit diversity (STD) or transmit adaptive array diversity (TxAA) are employed, the transmitter produces symbol sequence $D_1^K$ on lead 218. This sequence is multiplied by user specific code $C^K$ by circuit 220 and applied to summation circuit 212. The symbol sequence $D_1^K$ is summed by circuit 212 together with other user specific signals and transmitted over the radio channel 261 as previously described. The communication circuit of the present invention, therefore, is compatible with STTD as well as no diversity transmission.

Figure 3:
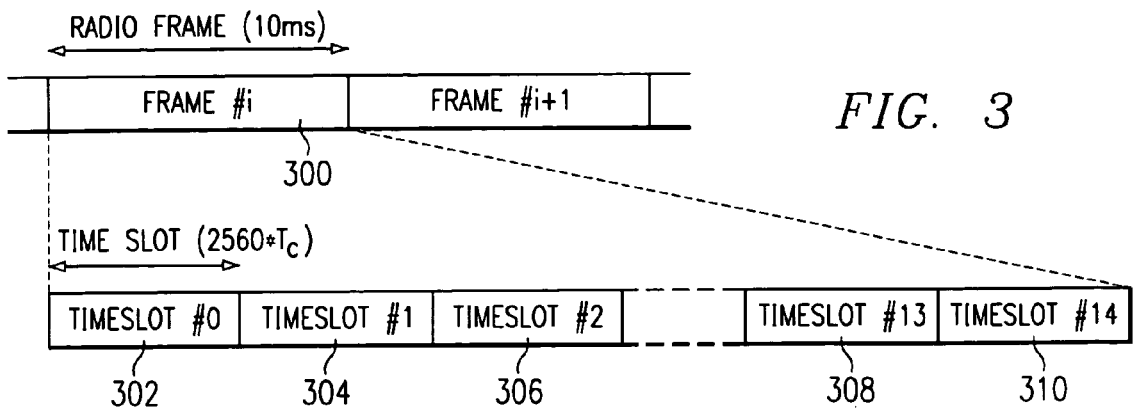
FIG. 3 is a diagram of a TDD radio frame.
Figure 4:
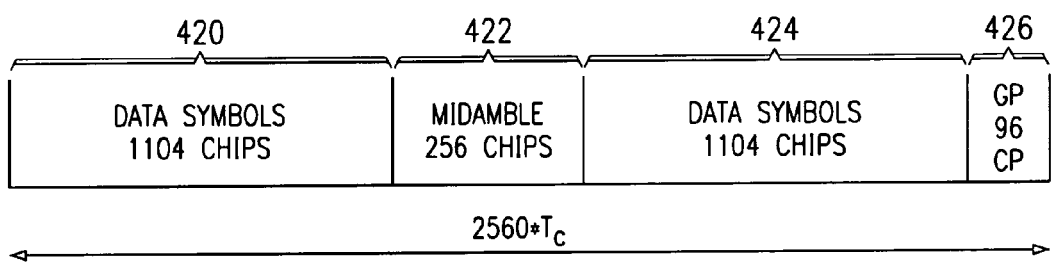
FIG. 4 is a diagram of a time slot within the radio frame of FIG. 3.

Referring now to FIG. 3, there is a diagram of a TDD radio frame that may be transmitted by the communication system of FIG. 2. The radio frame, for example radio frame 300, has a duration of 10 ms. The radio frame is divided into 15 equal time slots 302-310. Each of these time slots is further divided into 2560 chip times $T_C$. The diagram of FIG. 4 illustrates the structure of the TDD time slot. The time slot includes a first group of data symbols 420 having 1104 chips. This first group corresponds to 69 data symbols for an exemplary spreading factor of 16. The first group is followed by a midamble 422 having 16 symbols for the exemplary spreading factor of 16. These midamble symbols are a predetermined training sequence similar to pilot symbols of FDD systems. The midamble symbols are cyclically time shifted for different users in the cell as previously discussed. A second group of data symbols 424 having another 1104 chips follows the midamble. Finally, the second group of data symbols is followed by a guard period 426 of 96 chips.

Figure 5A:
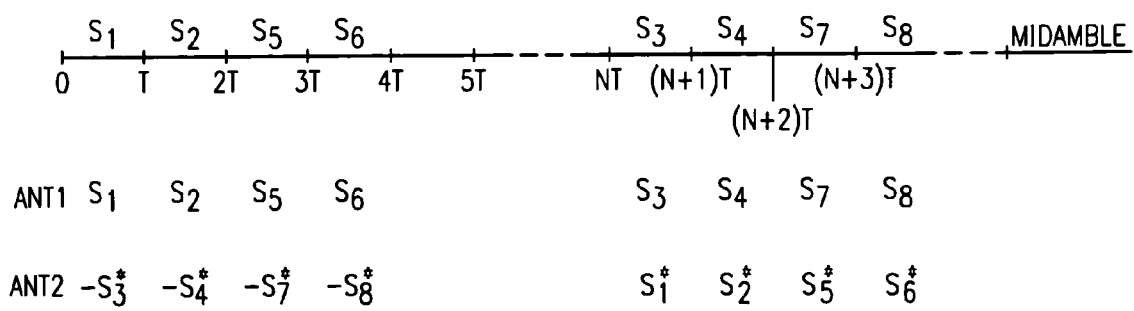
FIG. 5A is a diagram showing an embodiment of the symbol transmit sequence for TDD with STTD encoding.

Referring now to FIG. 5A, there is a diagram showing an embodiment of the symbol transmit sequence for TDD with STTD encoding. The exemplary symbol sequence $S_1$-$S_8$ shows a partial sequence of data symbols presented to the transmit circuit on lead 106 (FIG. 1). This symbol sequence corresponds to data symbols 420 that precede midamble 422 (FIG. 4). The symbols are rearranged and transformed for transmission from antennas ANT 1 and ANT 2 according to symbol transmit times 0, T, 2T . . . (N+3)T. There are 2NT symbol transmit times corresponding to the first group of data symbols 420. Symbol transmit time NT, therefore, is approximately in the middle of the transmit sequence of data symbols 420. For example, symbols $S_1$ and $S_2$ are transmitted at transmit times T and 2T, respectively, from antenna ANT 1. Transformed symbols $-S_3^*$ and $-S_4^*$ are transmitted simultaneously at transmit times T and 2T, respectively, from antenna ANT 2. These transformed symbols are complements of complex conjugates of respective symbols $S_3$ and $S_4$. The sequence continues for symbols 420 and 424 (FIG. 4). This transmit sequence advantageously provides reduces the complexity of the zero forcing (ZF-STTD) and the minimum mean squared error (MMSE-STTD) STTD decoders by allowing the receiver to neglect the intersymbol interference (ISI) of the block of data symbols 0 to (N−1)T on the NT of 2NT symbols.

Figure 5B:
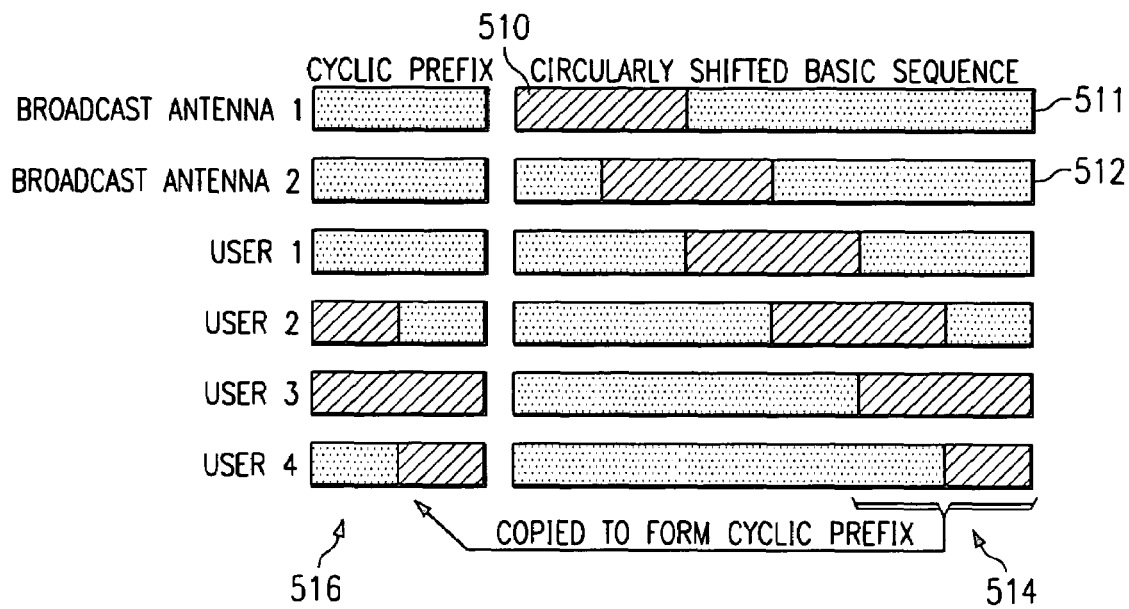
FIG. 5B is a diagram showing an embodiment of the midamble structure that is used for channel estimation.

Referring to FIG. 5B, there is a diagram showing an embodiment of the midamble pattern that is used for channel estimation. The basic sequence extends for the entire length of the midamble except for the cyclic prefix. This basic sequence is circularly shifted as taught by B. Steiner and P. W. Baier, *Low Cost Channel Estimation in the Uplink Receiver of CDMA Mobile Radio Systems*, Frequenz., vol. 47, 292-298 (1993), to obtain channel estimates for different users. The cyclic prefix 516 is obtained by copying over the tail end 514 of the circularly shifted basic sequence. The shaded region 510 is the first 64 bits of the basic midamble sequence. In the present invention, the first two time shifts 511-512 are allotted for channel estimates for antenna 1 and antenna 2, respectively, of the broadcast channel. The broadcast channel, therefore, transmits midamble shift 511 from antenna 1 midamble shift 512 from antenna 2. Receivers using STTD preferably use two midamble shifts for channel estimation similar to the broadcast channel. Alternatively, a non-STTD receiver preferably uses the same midamble shift from both antennas with a suitable weighting corresponding to respective transmit beam forming for that user.

Figure 6A:
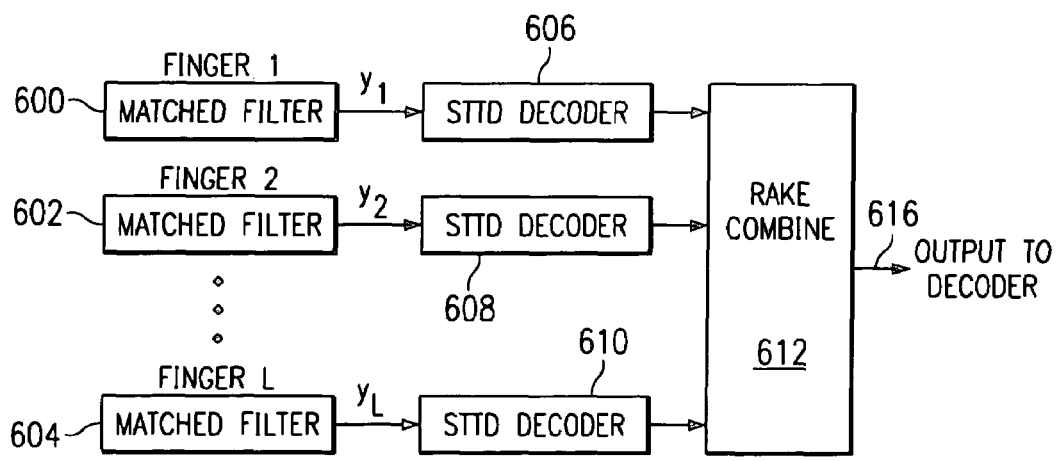
FIG. 6A is a block diagram showing signal flow for a single user for a TDD receiver of the present invention using STTD encoding.

Turning now to FIG. 6A, there is a block diagram showing signal flow at the receiver for a single user for a TDD receiver of the present invention using STTD encoding. The receiver includes matched filters 600-604. Each of the matched filter circuits is coupled to a respective STTD decoder circuit 606-610. The STTD decoder circuits 606-610 are coupled to rake combiner circuit 612. Each matched filter and respective STTD decoder corresponds to a finger of the rake combiner circuit 612. These fingers are coupled to selectively pass different multipath signals such as Path 1 (116) through Path j (118) of FIG. 1. The selected multipath signals are then combined by the rake combiner 612 and sent to a channel decoder such as a Turbo decoder or a Viterbi decoder for further processing.

Figure 6B:
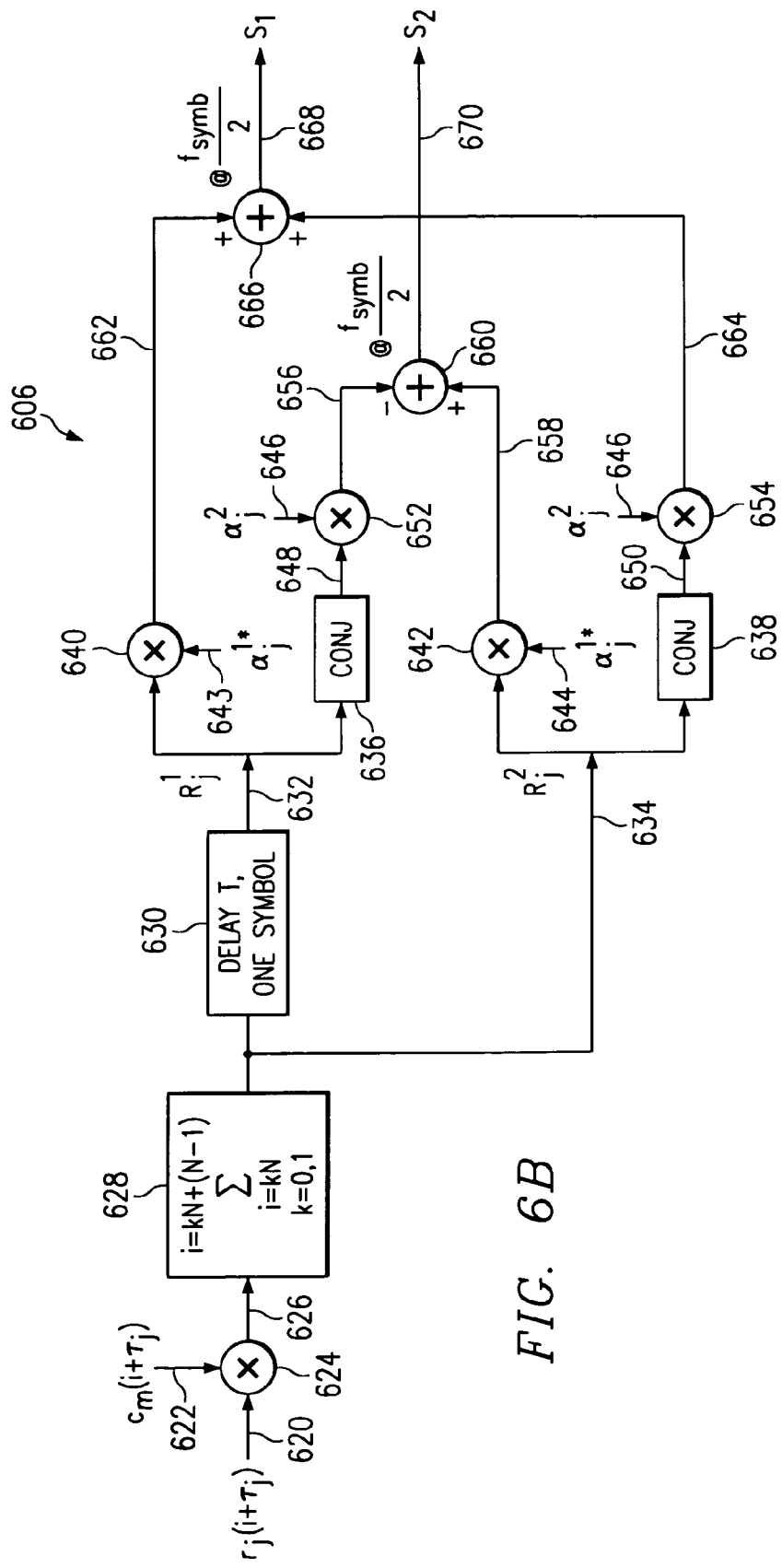
FIG. 6B is a schematic diagram of the STTD decoder of FIG. 6A.

An exemplary STTD decoder 606 shown at FIG. 6B may be used for the STTD decoders 606-610 of FIG. 6A. Rayleigh fading parameters are determined from channel estimates of midamble symbols transmitted from respective antennas at leads 112 and 114. For simplicity of analysis, a Rayleigh fading parameter $\alpha_j^1$ is assumed for a signal transmitted from the first antenna 112 along the $j^{th}$ path. Likewise, a Rayleigh fading parameter $\alpha_j^2$ is assumed for a signal transmitted from the second antenna 114 along the $j^{th}$ path. Each $i^{th}$ chip or bit signal $r_j(i+\tau_j)$ of a respective symbol is subsequently received at a remote mobile antenna 120 after a transmit time $\tau_j$ corresponding to the $j^{th}$ path. The chip signals at lead 620 are multiplied by a channel orthogonal code at lead 622 by circuit 624 to produce a user specific signal on lead 626. The signals on lead 626 are applied to a despreader input circuit 628 where they are summed over each respective symbol time to produce output signals $R_j^1$ at lead 632 and $R_j^2$ at lead 634 corresponding to the $j^{th}$ of L multiple signal paths. Circuit 630 delays signal $R_j^1$ by one symbol time so that it is synchronized with signal $R_j^2$ at lead 634. A phase correction circuit receives signals $R_j^1$ and $R_j^2$ as input signals on leads 632 and 634 as shown in equations [1-2], respectively.

$$R_j^1 = \sum_{i=0}^{N-1} r_j(i+\tau_j) = \alpha_j^1 S_1 - \alpha_j^2 S_2^* \qquad [1]$$

$$R_j^2 = \sum_{i=0}^{2N-1} r_j(i+\tau_j) = \alpha_j^1 S_1 - \alpha_j^2 S_1^* \qquad [2]$$

The phase correction circuit receives a complex conjugate of a channel estimate of a Rayleigh fading parameter $\alpha_j^{1*}$ corresponding to the first antenna on leads 643 and 644 and a channel estimate of another Rayleigh fading parameter $\alpha_j^2$ corresponding to the second antenna on lead 646, Circuit 640 produces a product of signal $R_j^1$ and channel estimate $\alpha_j^{1*}$ at lead 662. Circuit 642 produces a product of signal $R_j^2$ and channel estimate $\alpha_j^{1*}$ at lead 658. Complex conjugates of the input signals are produced by circuits 636 and 638 at leads 648 and 650, respectively. Circuit 652 produces a product of the conjugate at lead 648 and channel estimate $\alpha_j^2$ at lead 656. Circuit 654 produces a product of the conjugate at lead 650 and channel estimate $\alpha_j^2$ at lead 664. Circuit 666 adds the signals at leads 662 and 664 and produces an average at lead 668. Circuit 660 subtracts the signal at lead 656 from the signal at lead 658 and produces an average at lead 670. These averages are path-specific first and second symbol estimates at respective output leads 668 and 670 as in equations [3-4].

$$R_j^1 \alpha_j^{1*} + R_j^{2*} \alpha_j^2 = (|\alpha_j^1|^2 + |\alpha_j^2|^2) S_1 \qquad [3]$$

$$-R_j^{1*} \alpha_j^2 + R_j^2 \alpha_j^{1*} = (|\alpha_j^1|^2 + |\alpha_j^2|^2) S_2 \qquad [4]$$

These path-specific symbol estimates are then applied to the rake combiner circuit 612 to sum individual path-specific symbol estimates, thereby providing net soft symbols as in equations [5-6] at lead 616.

$$\tilde{S}_1 = \sum_{j=1}^{L} R_j^1 a_j^{1*} + R_j^{2*} a_j^2 \quad [5]$$

$$\tilde{S}_2 = \sum_{j=1}^{L} -R_j^{1*} a_j^2 + R_j^2 a_j^{1*} \quad [6]$$

These soft symbols or estimates provide a path diversity L and a transmit diversity 2. Thus, the total diversity of the STTD system is 2L. This increased diversity is highly advantageous in providing a reduced bit error rate.

Figure 7:
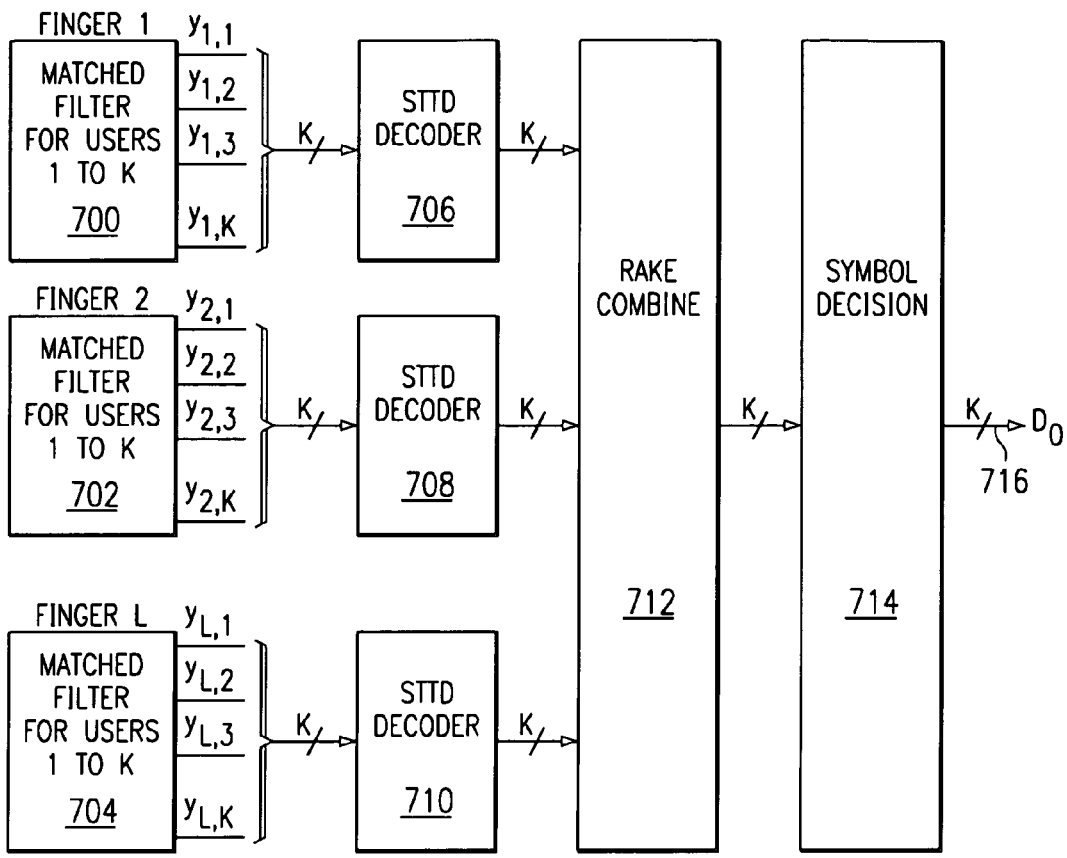
FIG. 7 is a block diagram showing signal flow for multiple users for a TDD receiver of the present invention using STTD encoding.

Referring now to FIG. 7, there is a block diagram showing signal flow for multiple users for a TDD receiver of the present invention using STTD encoding. This diagram is an extension of the circuits of FIG. 6A and FIG. 6B to perform parallel interference cancellation for multiple users as will be described in detail. There are L fingers which despread received signals from K users. Matched filter circuits 700-704, therefore, selectively pass L signals corresponding to each respective multipath for each of K users. These matched filter output signals are applied to respective STTD decoder circuits 706-710 and, subsequently, to rake combiner circuit 712. The rake combiner circuit 712 combines L multipath signals for each of K. The combined signals for the K users are applied to symbol decision circuit 714. Each of the K symbols are determined and produced as output signals on bus 716.

Figure 8:
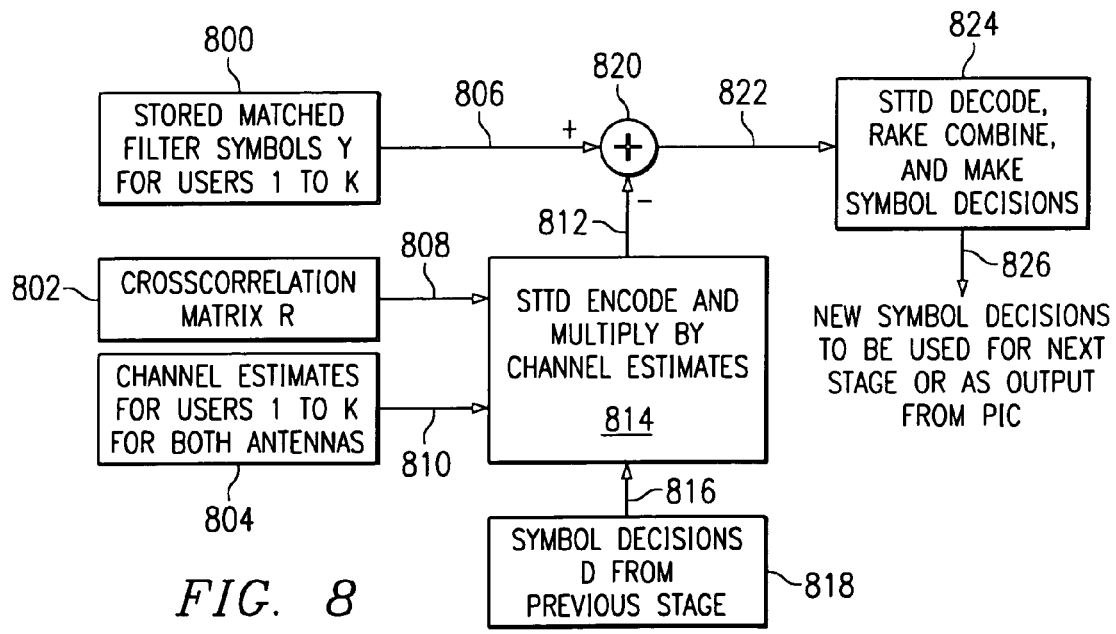
FIG. 8 is a block diagram showing parallel interference cancellation of the present invention for TDD with STTD encoding.

As previously mentioned, the spreading factor (SF) or chips per symbol of the modulation is preferably sixteen or less for these TDD data symbols. Furthermore, the basic periodic code that modulates midamble symbols within a cell is shifted to uniquely identify each mobile unit within the cell. Since the periodic code within the cell is the same and the spreading factor is small, therefore, interference from the base station and other mobile units within the cell is not received as Gaussian noise. Typical matched filter circuits used in FDD systems are unsuitable for eliminating this intra cell interference. The circuit of FIG. 8 is a block diagram of a first embodiment of the present invention showing parallel interference cancellation of the present invention for TDD with STTD encoding. Data symbols from matched filter circuits 700-704 are stored in memory circuit 800 as shown in equation [7].

$$Y = (y_{1,1}, y_{1,2}, \ldots, y_{1,K}, y_{2,1}, y_{2,2}, \ldots, y_{2,K}, \ldots, y_{L,1}, y_{L,2}, \ldots, y_{L,K})^T \quad [7]$$

A cross-correlation matrix is calculated and stored in memory circuit 802 to determine the interference effect of each path of each finger of each user on all the other paths. The cross-correlation matrix R is calculated by first computing all the cross-correlations between each symbol of each finger for each user. This step is completed for preceding symbols, present time symbols and for next time symbols, thereby producing three LK matrices. Then the middle LK matrix diagonal is set to zero to exclude self-correlation. Thus cross-correlation matrix R is LK×3LK. Initial channel estimates for each antenna given by equations [8-9] are stored in memory circuit 804.

$$a^{(0)} = (a_{1,1}^{(0)}, a_{1,2}^{(0)}, \ldots, a_{1,K}^{(0)}, \ldots, a_{2,1}^{(0)}, a_{2,2}^{(0)}, \ldots, a_{2,K}^{(0)}, \ldots, a_{L,1}^{(0)}, a_{L,2}^{(0)}, \ldots, a_{L,K}^{(0)})^T \quad [8]$$

$$b^{(0)} = (b_{1,1}^{(0)}, b_{1,2}^{(0)}, \ldots, b_{1,K}^{(0)}, \ldots, b_{2,1}^{(0)}, b_{2,2}^{(0)}, \ldots, b_{2,K}^{(0)}, \ldots, b_{L,1}^{(0)}, b_{L,2}^{(0)}, \ldots, b_{L,K}^{(0)})^T \quad [8]$$

Initial data symbol estimates include two symbols for each user and are given by equation [10] are stored in memory circuit 818.

$$D_0 = (d_{1,1}^{(0)}, d_{1,2}^{(0)}, \ldots, d_{1,K}^{(0)}, \ldots, d_{2,1}^{(0)}, d_{2,2}^{(0)}, \ldots, d_{2,K}^{(0)})^T \quad [10]$$

These initial data symbols are STTD encoded and multiplied by the initial channel estimates stored in memory circuit 804 via 810 as shown in equations [11-12] for path p and stored in circuit 814.

$$e_{1,p}^{(0)} = (a_{p,1}^{(0)} d_{1,1}^{(0)} - b_{p,1}^{(0)} d_{2,1}^{*(0)}, a_{p,2}^{(0)} d_{1,2}^{(0)} - b_{p,2}^{(0)} d_{2,2}^{*(0)}, \ldots, a_{p,K}^{(0)} d_{1,K}^{(0)} - b_{p,K}^{(0)} d_{2,K}^{*(0)})^T \quad [11]$$

$$e_{2,p}^{(0)} = (a_{p,1}^{(0)} d_{2,1}^{(0)} + b_{p,1}^{(0)} d_{1,1}^{*(0)}, a_{p,2}^{(0)} d_{2,2}^{(0)} + b_{p,2}^{(0)} d_{1,2}^{*(0)}, \ldots, a_{p,K}^{(0)} d_{2,K}^{(0)} + b_{p,K}^{(0)} d_{1,K}^{*(0)})^T \quad [12]$$

Circuit 814 multiplies these STTD encoded data symbols of equations [11-12] by cross correlation matrix R from circuit 802 via 808 to produce a signal estimate given by equation [13]

$$E = (e_{2,1}^{(-1)}, e_{2,2}^{(-1)}, \ldots, e_{2,L}^{(-1)}, e_{1,1}^{(0)} e_{1,2}^{(0)}, \ldots, e_{1,L}^{(0)}, e_{2,1}^{(0)}, e_{2,2}^{(0)}, \ldots, e_{2,L}^{(0)})^T \quad [13]$$

This signal estimate is then multiplied by the cross-correlation matrix R to generate the inter-symbol interference (ISI) estimate at lead 812. Circuit 820 subtracts this ISI estimate at lead 812 from the stored matched filter symbols Y at lead 806 to produce a first iteration of corrected data symbols on lead 822. This first iteration of new data symbols is decoded and rake combined at circuit 824 to produce new symbol decisions on lead 826. These new symbols on lead 826 then replace initial symbols stored in memory circuit 818. The previous procedure is then repeated to produce second and subsequent iterations of corrected data symbols on lead 822. New symbol decisions $Y_i$ are made for a predetermined number of iterations according to equation [14] until ISI is effectively cancelled. Thus, the parallel interference cancellation circuit of FIG. 8 produces new symbol decisions $Y_i$ as a difference between previous symbol decisions $Y_{i-1}$ and a product of correlation matrix R and the previous signal estimate matrix $E_{i-1}$.

$$Y_i = Y_{i-1} - RE_{i-1} \quad [14]$$

Referring back to FIG. 2, a system model for alternative embodiments of interference cancellation of the present invention will be explained in detail. The circuit of FIG. 2 includes a base station to the left of radio channel 261. The base station transmits STTD encoded data symbols for L of K users from antenna 1 at 230 given by equation [15]. The base station transmits corresponding data symbols for these same users at antenna 2 (236) given by equation [16].

$$D_1^k = \frac{D^k}{\sqrt{2}}; k = 1, \ldots, L \quad [15]$$

$$D_2^k = \left( \left(\frac{-d_2^k}{\sqrt{2}}\right)^*, \left(\frac{d_1^k}{\sqrt{2}}\right)^*, \left(\frac{-d_4^k}{\sqrt{2}}\right)^*, \left(\frac{d_3^k}{\sqrt{2}}\right)^*, \ldots, \left(\frac{-d_M^k}{\sqrt{2}}\right)^*, \left(\frac{d_{M-1}^k}{\sqrt{2}}\right)^* \right); \quad k = 1, 2, \ldots, L \quad [16]$$

The term $\sqrt{2}$ in the denominator of equations [15-16] is due to the balanced transmit power at each antenna for STTD encoding. Data symbols for the remaining K-L users are transmitted without STTD encoding only from antenna 1 at 230 given by equation [17].

$$D_1^k = D^k; k = L+1, \ldots, K \quad [17]$$

Transmit data rates for all users are the same. Each data symbol is repeated G times and multiplied by a respective user-specific orthogonal code as in equation [18] by circuits 208, 220 and 214.

$$C^k = (c_1^k, c_2^k, \ldots, c_G^k)^T; k=1, \ldots, K \quad [18]$$

The chip period for each data symbol is $T_c = T_S/G$. After the user-specific spreading, the signals data symbols for all K users are summed by circuit 212 and applied to antenna 1 at 230. The radio channel further imposes an impulse response of length W at 232 on data symbols transmitted by antenna 1 sampled at a chip rate as in equation [19]. A corresponding impulse response on data symbols transmitted by antenna 2 is given by equation [20].

$$H_1 = (h_1^1, h_1^2, \ldots, h_1^W)^T \quad [19]$$

$$H_2 = (h_2^1, h_2^2, \ldots, h_2^W)^T \quad [20]$$

A value of W greater than 1 for a given user results in intersymbol interference (ISI) of the user's symbols and multiple access interference (MAI) of other users symbols due to the loss or orthogonality. Even though an exemplary chip rate sampling is assumed for the purpose of illustration, the channel may have to be sampled at twice the chip rate to implement a fractionally spaced equalizer at the mobile as will be appreciated by one of ordinary skill in the art. However, analysis of the STTD decoder for a fractionally spaced equalizer and multi-user detector is the same as for the exemplary chip rate sampling. A combined channel response for antennas 1 and 2 is given by equations [21] and [22], respectively.

$$U^k = (u_1^k, u_2^k, \ldots, u_{G+W-1}^k) = C^k H_1 \quad [21]$$

$$V^k = (v_1^k, v_2^k, \ldots, v_{G+W-1}^k) = C^k H_2 \quad [22]$$

A composite data symbol vector for a block of MW symbols from both antennas is produced by 242 at transmit path 244 as in equation [23].

$$\bar{D} = ((D^1)^T, (D^2)^T, \ldots, (D^k)^T)^T = (d_1^1, d_2^1, \ldots, d_M^1, \\ d_1^2, \ldots, d_M^2, \ldots, d_1^k, d_2^k, \ldots, d_M^k, \ldots, d_1^K, \\ d_2^K, \ldots, d_M^K) \quad [23]$$

Additive Gaussian noise $\bar{N}$ at the sampled at the chip rate is added at 246 as in equation [24] to produce a composite signal at the mobile receiver antenna 250.

$$\bar{N} = (n_1, n_2, \ldots, n_{M*G+W-1})^T \quad [24]$$

This received sequence $\bar{R}$ at 250 sampled at the chip rate is of length (MG+W−1) and it is the sum of the signals from the two antennas and the additive Gaussian noise given by equation [25].

$$\bar{R} = A\bar{D} + B\bar{D}^* + \bar{N} = [A\ B] \begin{bmatrix} \bar{D} \\ \bar{D}^* \end{bmatrix} + \bar{N} \quad [25]$$

Elements of the matrices $A=(A_{ij})$ and $B=(B_{ij})$ are given by equations [26-30], where i=1, 2, ... M*G+W−1 and j=1, 2, ..., K*M. Elements of matrix B are given by equations [28] and [30] for an even number of elements and by equations [29-30] for an odd number of elements.

$$A_{G*(m-1)+l,m+M*(k-1)} = \quad [26]$$
$$\begin{cases} \dfrac{u_l^k}{\sqrt{2}} & \text{for } k = 1, 2, \ldots J, m = 1, 2, \ldots M, l = 1, 2, \ldots G+W-1 \\ u_l^k & \text{for } k = J+1, \ldots, K, m = 1, 2, \ldots M, l = 1, 2, \ldots G+W-1 \end{cases}$$

$$A_{G*(m-1)+l,m+M*(k-1)} = 0 \text{ otherwise} \quad [27]$$

$$B_{G*(m-2)+l,m-1+M*(k-1)} = \dfrac{v_l^k}{\sqrt{2}} \text{ for } k = 1, 2, \ldots L, \quad [28]$$
$$m = 2, 4, 6, 8, \ldots M, l = 1, 2, \ldots G+W-1$$

$$B_{G*m+l,m+1+M*(k-1)} = \dfrac{-v_l^k}{\sqrt{2}} \text{ for } k = 1, 2, \ldots L, \quad [29]$$
$$m = 1, 3, 5, \ldots (M-1), l = 1, 2, \ldots G+W-1$$

$$B_{G*(m-1)+l,m+M*(k-1)} = 0 \text{ otherwise} \quad [30]$$

The structure of the matrix B occurs because of the STTD encoding. This structure is substantially different from the prior art. For example, Klein et al. and Naguib et al. teach a structure corresponding to equation [25] with matrix B equal to zero. These formulations of the prior art work in the absence of a multi-path channel. In the presence of a multi-path channel, however, the structure of equation [25] cannot cancel either inter-symbol interference (ISI) or multiple access interference (MAI). This is only accomplished by including the received signal matrix $\bar{R}$ together with the complex conjugate matrix $\bar{R}^*$ to remove both ISI and MAI. This structure is highly advantageous in the joint detector design of the present invention. The structure of the matrix B, represented in equation [25], therefore, is rewritten in conjugate form in equation [31].

$$\begin{bmatrix} \bar{R} \\ \bar{R}^* \end{bmatrix} = \begin{bmatrix} A & B \\ B^* & A^* \end{bmatrix} \begin{bmatrix} \bar{D} \\ \bar{D}^* \end{bmatrix} + \begin{bmatrix} \bar{N} \\ \bar{N}^* \end{bmatrix} \quad [31]$$

Even though the equations for $\bar{R}^*$ are related to the equations for $\bar{R}$ in equation [25], the equations [31] are linearly independent if the original equations [25] are linearly independent. Thus, conjugate matrices are rewritten as in equations [32] and equation [31] is rewritten as equation [33].

$$\tilde{R} = \begin{bmatrix} \bar{R} \\ \bar{R}^* \end{bmatrix}, \tilde{A} = \begin{bmatrix} A & B \\ B^* & A^* \end{bmatrix}, \tilde{D} = \begin{bmatrix} \bar{D} \\ \bar{D}^* \end{bmatrix} \text{ and } \tilde{N} = \begin{bmatrix} \bar{N} \\ \bar{N}^* \end{bmatrix} \quad [32]$$

$$\tilde{R} = \tilde{A}\tilde{D} + \tilde{N} \quad [33]$$

Figure 9A:
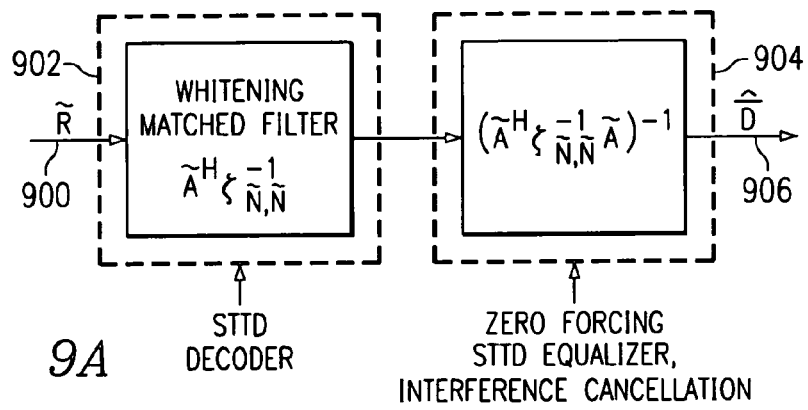
FIG. 9A is a block diagram of interference cancellation with an STTD decoder and a zero forcing STTD equalizer.

Turning now to FIG. 9A, there is a block diagram of another embodiment of interference cancellation circuit of the present invention with an STTD decoder and a zero forcing STTD equalizer. The received signal $\tilde{R}$ of equation [33] is applied to via lead 900 to a whitening matched filter 902. This whitening matched filter includes the multiple finger matched filters 700-704 and their respective sampling STTD decoders 706-710 of FIG. 7. A product of this received signal and the whitening matched filter is applied to a zero forcing STTD equalizer circuit 904 to produce data symbol matrix $\hat{D}$ at lead 906. The term inside the zero forcing STTD equalizer circuit 904 yields a zero forcing solution to equation [33] without any intersymbol interference (ISI) or multiple access interference (MAI) as given in equation [34], where $\zeta_{\tilde{N},\tilde{N}}$ is the covariance of the noise vector $\tilde{N}$. and $(.)^H$ denotes the Hermitian operation on a matrix.

$$\begin{bmatrix} \hat{D} \\ \hat{D}^* \end{bmatrix}_{ZF-STTD} = (\tilde{A}^H \zeta_{\tilde{N},\tilde{N}}^{-1} \tilde{A})^{-1} \tilde{A}^H \zeta_{\tilde{N},\tilde{N}}^{-1} \tilde{R} \qquad [34]$$

For the special case of $\zeta_{\tilde{N},\tilde{N}} = \sigma^2 I_{2*(M*G+W-1) \times 2*(M*G+W-1)}$ the ZF-STTD is given by equation [35].

$$\begin{bmatrix} \hat{D} \\ \hat{D}^* \end{bmatrix}_{ZF-STTD} = (\tilde{A}^H \tilde{A})^{-1} \tilde{A}^H \tilde{R} \qquad [35]$$

Since $\hat{D}$ and $\hat{D}^*$ yield the same estimate for received data symbols, it is only necessary to calculate one of them. However, the intermediate steps that are involved that is, calculating $\tilde{A}^H \tilde{R}$ and the $(\tilde{A}^H \tilde{A})^{-1}$ have to be performed completely. A Cholesky decomposition of the matrix $\tilde{A}^H \zeta_{\tilde{N},\tilde{N}}^{-1} \tilde{A}$ is given by equation [36].

$$\tilde{A}^H \zeta_{\tilde{N},\tilde{N}}^{-1} \tilde{A} = (\Sigma H)^{-1} \Sigma H \qquad [36]$$

Figure 9B:
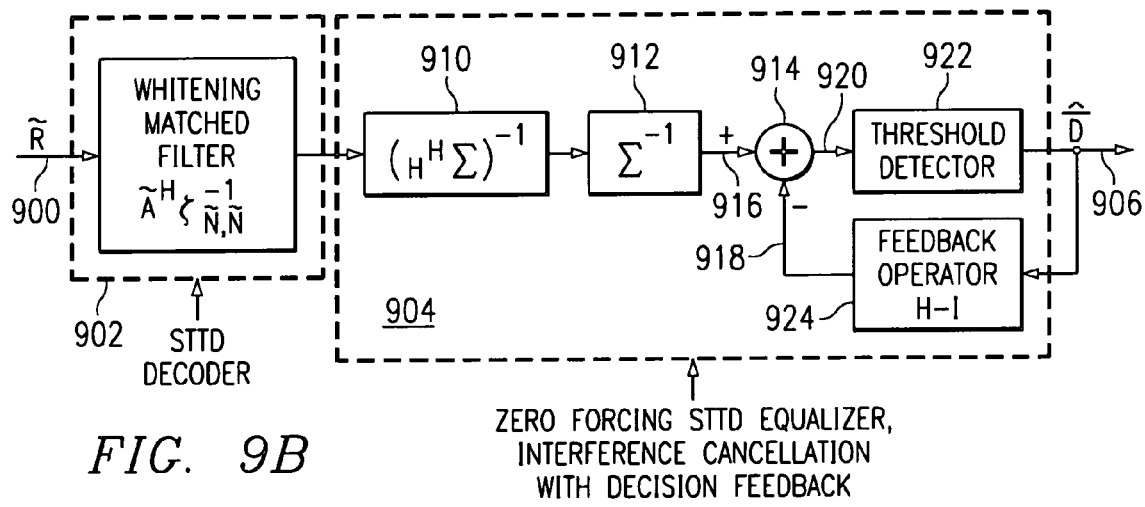
FIG. 9B is a detailed block diagram of FIG. 9A showing the zero forcing STTD equalizer with decision feedback.

The term $\Sigma$ is a diagonal matrix and H is an upper triangular matrix. The Cholesky decomposition in equation [36] greatly reduces the calculation complexity of equation [35] by eliminating the term $(\tilde{A}^H \tilde{A})^{-1}$. The Cholesky formulation of equation [36] is performed by circuits 910 and 912 (FIG. 9B) and provides a means for solving equation [35] using a forward equation obtained from the upper triangular matrix H. The Cholesky formulation is applied to circuit 914 via 916, where it is added to the feedback signal on 918. The output of circuit 914 is applied to threshold detector 922 via 920 to produce a next iteration of $\hat{D}$ on 906. The detailed block diagram of FIG. 9B illustrates the iterative solution to equation [34] of the zero forcing STTD equalizer with decision feedback. Derivation and use of the feedback operator 924 is explained in detail Anja Klein et al. at 280.

Figure 10A:
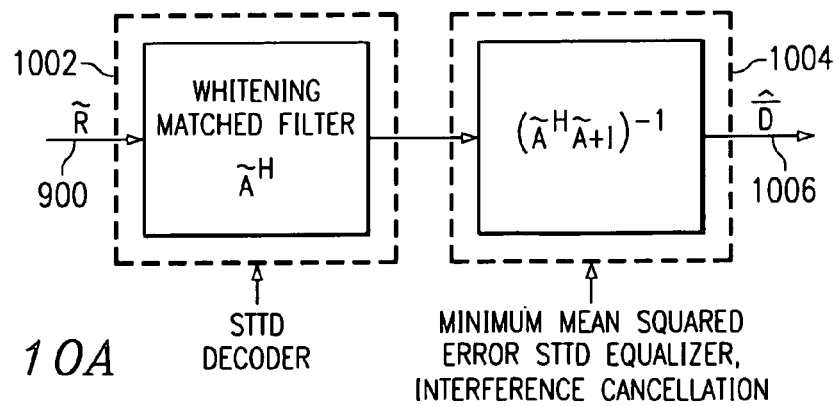
FIG. 10A is a block diagram of interference cancellation with an STTD decoder and a minimum mean squared error STTD equalizer.

Referring now to FIG. 10A, there is a block diagram of a third embodiment of interference cancellation of the present invention with an STTD decoder 1002 and a minimum mean squared error STTD equalizer 1004 to produce data symbol matrix $\hat{D}$ at 1006. For data covariance matrix $\zeta_{\tilde{D},\tilde{D}}$, the minimum mean squared error solution for STTD decoding (MMSE-STTD) is given by equation [37].

$$\begin{bmatrix} \hat{D} \\ \hat{D}^* \end{bmatrix}_{MMSE-STTD} = (\tilde{A}^H \zeta_{\tilde{N},\tilde{N}}^{-1} \tilde{A} + \zeta_{\tilde{D},\tilde{D}}^{-1})^{-1} \tilde{A}^H \zeta_{\tilde{N},\tilde{N}}^{-1} \tilde{R} \qquad [37]$$

For the special case of $\zeta_{\tilde{N},\tilde{N}} = \sigma^2 I_{2*(M*G+W-1) \times 2*(M*G+W-1)}$ and $\zeta_{\tilde{D},\tilde{D}} = I_{2*(M*G+W-1) \times 2*(M*G+W-1)}$ the MMSE-STTD decoder solution is given by equation [38].

$$\begin{bmatrix} \hat{D} \\ \hat{D}^* \end{bmatrix}_{MMSE-STTD} = (\tilde{A}^H \tilde{A} + I)^{-1} \tilde{A}^H \tilde{R} \qquad [38]$$

Again since the $\hat{D}$ and $\hat{D}^*$ yield the same estimate for data, only one of them needs to be calculated in the end while the intermediate steps have to calculated completely.

Cholesky decomposition of the matrix $(\tilde{A}^H \tilde{A} + I)$ given by equation [39].

$$\tilde{A}^H \tilde{A} + I = (\Sigma H)^{-1} \Sigma H \qquad [39]$$

Figure 10B:
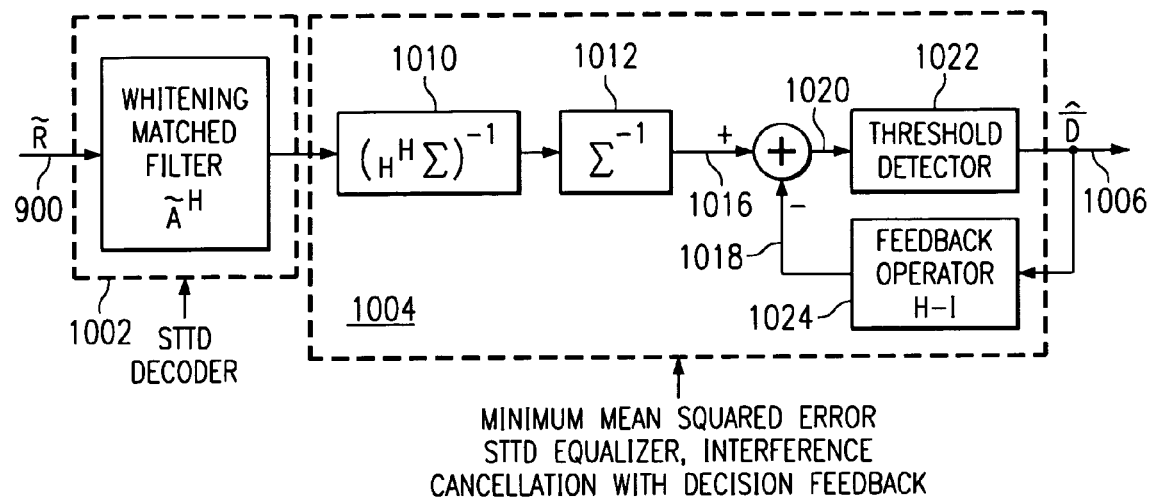
FIG. 10B is a detailed block diagram of FIG. 10A showing the minimum mean squared error STTD equalizer with decision feedback.

The Cholesky decomposition in equation [39] reduces the complexity of equation [38]. This is highly advantageous due to the calculation complexity of the term $(\tilde{A}^H \tilde{A} + I)$. The Cholesky formulation of equation [39] is performed by circuits 1010 and 1012 (FIG. 10B) and provides a means for solving equation [38] using a forward equation obtained from the upper triangular matrix H. The Cholesky formulation is applied to the sum circuit via 1016, where it is added to the feedback signal on 1018. The output of the sum circuit is applied to threshold detector 1022 via 1020 to produce a next iteration of $\hat{D}$ on 1006. The block diagram of FIG. 10B shows an iterative minimum mean squared error STTD equalizer with decision feedback. Derivation and use of the feedback operator 1024 is explained in detail by Klein et al, Id at 281.

Figure 11:
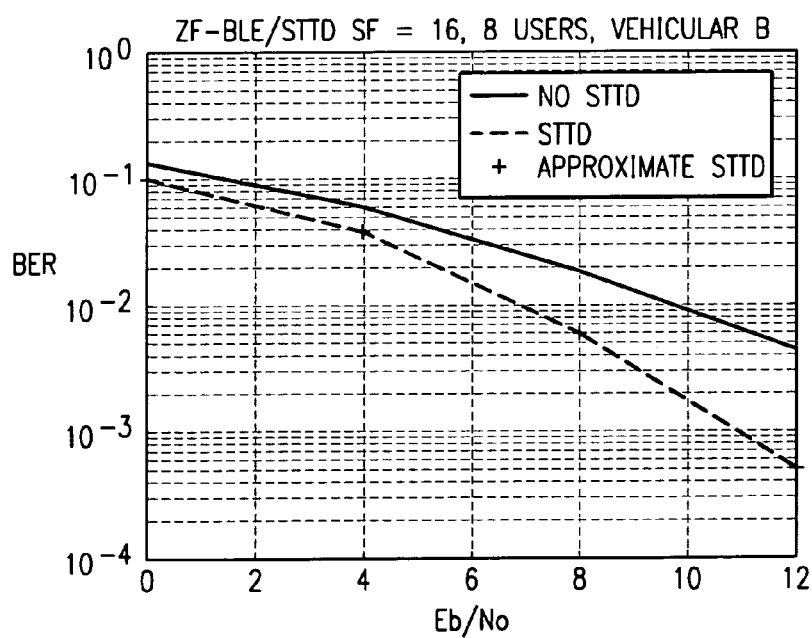
FIG. 11 is a simulation diagram showing bit error rate (BER) as a function of bit energy to noise (Eb/N$_0$) with and without diversity for vehicular Doppler rates with a spreading factor of 16.
Figure 12:
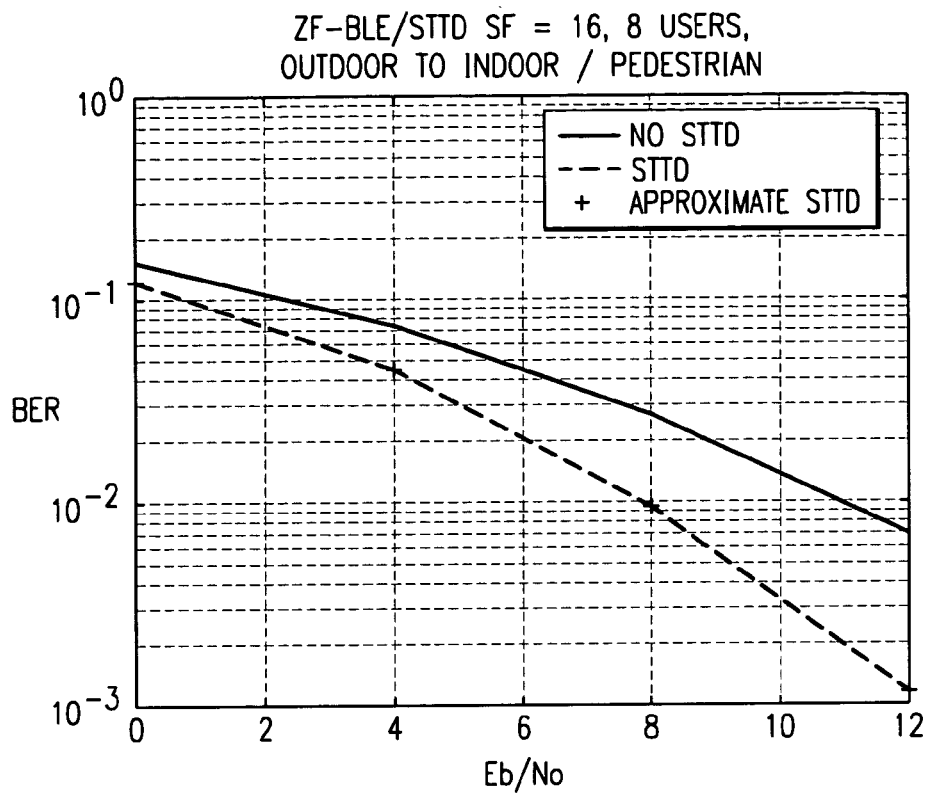
FIG. 12 is a simulation diagram showing bit error rate (BER) as a function of bit energy to noise (Eb/N$_0$) with and without diversity for pedestrian Doppler rates with a spreading factor of 16 and 8 users.

Referring now to FIG. 11, there is a simulation diagram showing bit error rate (BER) as a function of bit energy to noise ($Eb/N_0$) with and without diversity for vehicular Doppler rates with a spreading factor of 16. For an exemplary BER of $10^{-2}$ the zero forcing STTD receiver shows a 2.5 dB improvement over a comparable receiver without STTD. The a simulation diagram of FIG. 12 shows bit error rate (BER) as a function of bit energy to noise ($Eb/N_0$) with and without diversity for pedestrian Doppler rates with a spreading factor of 16 and 8 users. Both curves show improved bit energy to noise ratios compared to the simulation of FIG. 11 for the relatively higher vehicular Doppler rate. Moreover, the STTD curve for a pedestrian Doppler rate shows a 3 dB improvement over the solid curve without STTD. Thus, STTD for TDD of the present invention provides significantly improved reception over systems of the prior art.

Figure 13A:
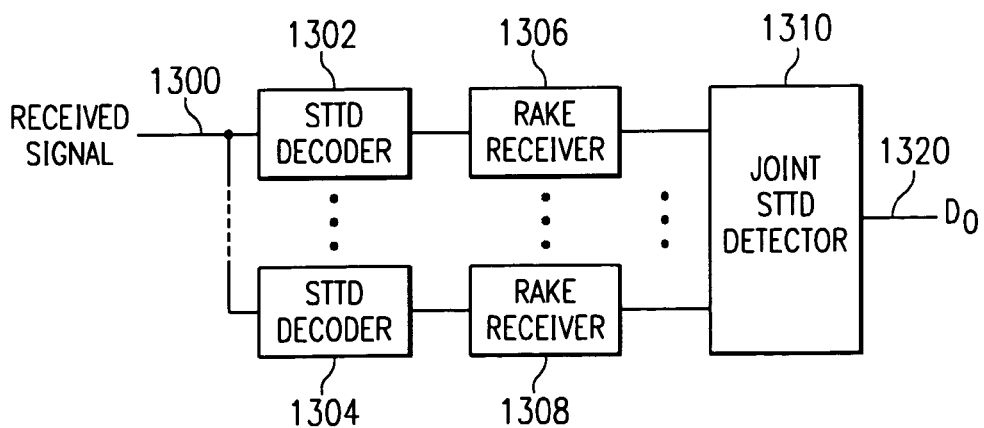
FIG. 13A is a block diagram of a receiver of the present invention including STTD decoders before the rake receivers and joint detector.
Figure 13B:
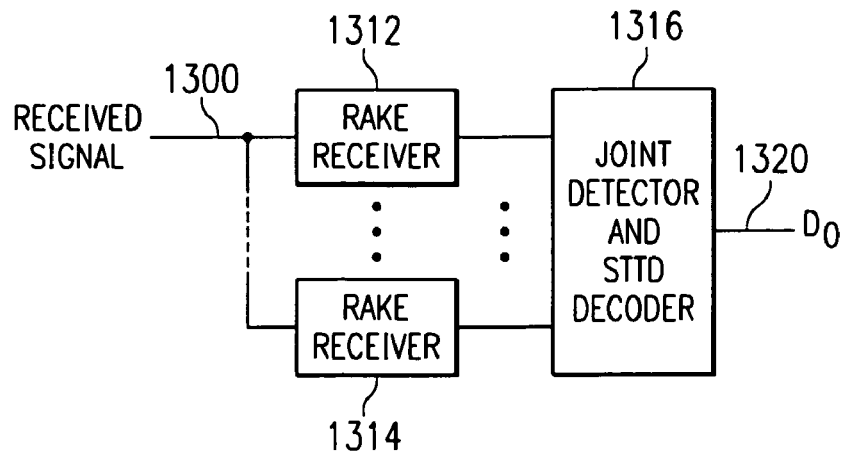
FIG. 13B is a block diagram of a receiver of the present invention having a combined joint detector and STTD decoder.
Figure 13C:
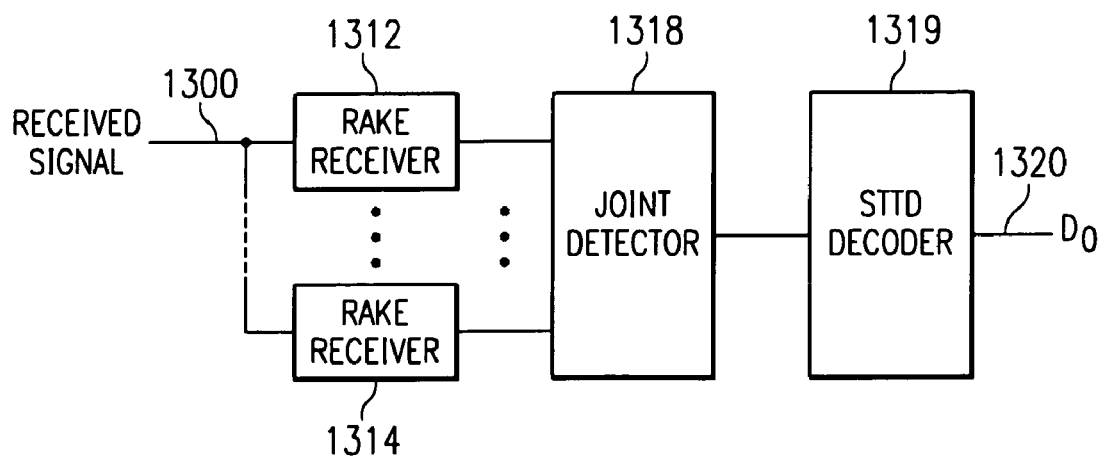
FIG. 13C is a block diagram of a receiver of the present invention including a joint detector followed by an STTD decoder.

Referring to FIG. 13A, there is a block diagram of a receiver of the present invention including STTD decoders before the rake receivers and joint detector. This circuit design is similar to that of FIG. 7. The circuit applies received signal on 1300 to STTD decoder circuits 1302-1304 corresponding to respective multipath signals. Each STTD decoder produces plural output signals that are coupled to respective rake receivers 1306-1308 to combine multipath signals for each respective user. The combined signals are then applied to joint STTD detector circuit 1310. The joint detector circuit utilizes detected signals for other users to eliminate interference from the intended user signal as previously described. The circuit of FIG. 13B is an alternative embodiment of the present invention. This embodiment includes rake receivers 1312-1314 arranged to combine multipath signals for each respective user. These combined signals are then applied to the combined joint detector and STTD decoder circuit 1316. The joint detector 1316 decodes the received signals for each user and subtracts interference signals for unintended users to produce the intended output signal $D_0$ on lead 1320. The circuit of FIG. 13C is yet another embodiment of the present invention. This embodiment includes rake receivers 1312-1314 as previously described.

Combined signals from the rake receivers are applied to the joint detector circuit 1318 for user identification and interference cancellation. The resulting signal is applied to STTD decoder 1319. The STTD decoder produces decoded output signal $D_0$ on lead 1320 for the intended user.

Although the invention has been described in detail with reference to its preferred embodiment, it is to be understood that this description is by way of example only and is not to be construed in a limiting sense. For example, several variations in the order of symbol transmission would provide the same 2L diversity. Moreover, the exemplary diversity of the present invention may be increased with a greater number of transmit or receive antennas. Furthermore, novel concepts of the present invention are not limited to exemplary circuitry, but may also be realized by digital signal processing as will be appreciated by those of ordinary skill in the art with access to the instant specification. For example, an alternative embodiment of the present invention having a spreading factor of one is equivalent to a time division multiple access (TDMA) system. Thus, IS-136, Enhanced Data GSM Environment (EDGE) and other cellular systems may use the present invention with STTD encoded multi-path signals for received channel equalization.

It is to be further understood that numerous changes in the details of the embodiments of the invention will be apparent to persons of ordinary skill in the art having reference to this description. It is contemplated that such changes and additional embodiments are within the spirit and true scope of the invention as claimed below.

What is claimed is:

1. A mobile time division duplex receiver comprising:
   A. a receiving antenna receiving radio signals that include equal time frames that are divided into equal time slots, each time slot includes a first group of data symbols, midamble symbols of a predetermined training sequence that are cyclically time shifted for different broadcast antenna and users, a second group of data symbols, and a guard period, the midamble symbols including a cyclic prefix obtained by copying over the tail end of the cyclically time shifted midamble symbols, the antenna providing received signals representing the data symbols and midamble symbols, the data symbols being block space time encoded over a block size of at least four symbols;
   B. filter circuitry having an input coupled to the received signals from the receiving antenna, the filter circuitry operating to provide channel estimate output signals of a first broadcast antenna and a second broadcast antenna in response to the midamble symbols, including the cyclic prefix; and
   C. space time transmit diversity decoder circuitry having inputs connected to the channel estimate output signals.

2. The receiver of claim 1 in which each frame has a duration of 10 ms.

3. The receiver of claim 1 in which each time slot includes 2560 chip times.

4. The receiver of claim 1 in which the first group of data symbols 420 has 1104 chips and corresponds to 69 data symbols for an exemplary spreading factor of 16.

5. The receiver of claim 1 in which the midamble has 16 symbols for an exemplary spreading factor of 16.

6. The receiver of claim 1 in which the second group of data symbols has 1104 chips.

7. The receiver of claim 1 in which the guard period has 96 chips.

8. The receiver of claim 1 in which the midamble symbols have a different cyclic prefix for each broadcast antennae and user.

* * * * *